United States Patent
Epps

(10) Patent No.: US 11,480,213 B2
(45) Date of Patent: Oct. 25, 2022

(54) BEARING MONITORING METHOD AND SYSTEM

(71) Applicant: Iain Kenton Epps, Christchurch (NZ)

(72) Inventor: Iain Kenton Epps, Christchurch (NZ)

(*) Notice: Subject to any disclaimer, the term of this patent is extended or adjusted under 35 U.S.C. 154(b) by 0 days.

(21) Appl. No.: 17/366,520

(22) Filed: Jul. 2, 2021

(65) Prior Publication Data
US 2021/0332848 A1 Oct. 28, 2021

Related U.S. Application Data

(63) Continuation of application No. 16/612,858, filed as application No. PCT/NZ2018/050065 on May 10, 2018, now Pat. No. 11,085,489.

(30) Foreign Application Priority Data

May 12, 2017 (NZ) .......................... 731838

(51) Int. Cl.
| | | |
|---|---|---|
| *F16C 19/52* | (2006.01) | |
| *F16C 33/34* | (2006.01) | |
| *G01L 5/00* | (2006.01) | |
| *G01P 3/44* | (2006.01) | |

(52) U.S. Cl.
CPC .............. *F16C 19/52* (2013.01); *F16C 33/34* (2013.01); *G01L 5/0019* (2013.01); *G01P 3/443* (2013.01)

(58) Field of Classification Search
CPC .... F16C 19/52; F16C 19/522; F16C 2233/00; G01L 5/0019; G01P 3/443
See application file for complete search history.

(56) References Cited

U.S. PATENT DOCUMENTS

| | | | | |
|---|---|---|---|---|
| 4,203,319 A | * | 5/1980 | Lechler | ................. G01L 5/0019 |
| | | | | 73/862.541 |
| 4,341,122 A | * | 7/1982 | Lechler | ................. G01M 13/04 |
| | | | | 73/862.045 |
| 5,140,849 A | | 8/1992 | Fujita | |
| 5,952,587 A | | 9/1999 | Rhodes et al. | |
| 6,695,483 B2 | | 2/2004 | Sakatani | |
| 7,389,701 B2 | * | 6/2008 | Mol | ...................... F16C 19/522 |
| | | | | 73/862.322 |

(Continued)

FOREIGN PATENT DOCUMENTS

WO 2006/030786 3/2006

OTHER PUBLICATIONS

McFadden et al., "Application of Synchronous Averaging to Vibration Monitoring of Rolling Element Bearings", Mechanical Sytems and Signal Processing 14(6): 891-906 (2000).

(Continued)

*Primary Examiner* — Phillip A Johnson
(74) *Attorney, Agent, or Firm* — Merchant & Gould P.C.

(57) ABSTRACT

This invention relates to a bearing monitoring method and system suitable for the monitoring of faults in rolling element bearings. The method and system utilize an acceleration sensor that is sensitive to both acceleration and housing strain and which has the effect of amplifying acceleration events that coincide with areas of the housing strain signal that correspond to bearing ball-pass events. The housing strain signal due to ball-pass events can be used to synchronise or otherwise modify the sampling of acceleration signals, or to determine bearing performance characteristics.

20 Claims, 9 Drawing Sheets

(56) References Cited

U.S. PATENT DOCUMENTS

| | | |
|---|---|---|
| 9,442,026 B2 | 9/2016 | Mol |
| 2004/0261543 A1 | 12/2004 | Van Leeuwen et al. |
| 2005/0040745 A1 | 2/2005 | Herman et al. |
| 2007/0277613 A1 | 12/2007 | Iwatsubo et al. |
| 2015/0107380 A1 | 4/2015 | Schmidt |
| 2016/0305845 A1 | 10/2016 | van der Ham |

OTHER PUBLICATIONS

McFadden et al., "Model for the Vibration Produced by Single Points Defect in A Rolling Element Bearing", Journal ol Sound and Vibration 96(1): 69-82 (1984).

Dr. S.J. Lacey, "An Overview of Bearing Vibration Analysis" Maintenance & Asset Management 23(6): 32-42 (2008).

SKF Multilog IMX—Rail Brochure, skf.com, PUB CM/P2 18245/1 EN (2020).

Sawalhi et al., "Vibration signal processing for spall size estimation in rolling element bearings using autoregressive inverse filtration combined with bearing signal synchronous averaging", Advances in Mechanical Engineering vol. 9(5): 1-20 (2017).

Randall, "Vibration-Based Condition Monitoring: Industrial, Aerospace and Automotive Applications", John Wiley & Sons (2011).

International Search Report and Written Opinion from International Application No. PCT/NZ2018/050065 dated Jul. 26, 2018 (15 pages).

Second International Written Opinion from International Application No. PCT/NZ2018/050065 dated May 27, 2019 (7 pages).

Response to Second Written Opinion from International Application No. PCT/NZ2018/050065 dated Jul. 24, 2019 (6 pages).

International Preliminary Report on Palatability from International Application No. PCT/NZ2018/050065 dated Sep. 22, 2019 (31 pages).

* cited by examiner

BEARING MONITORING METHOD AND SYSTEM

CROSS REFERENCES TO RELATED APPLICATIONS

This application is a continuation of U.S. application Ser. No. 16/612,858, filed, 12 Nov. 2019, which is a National Stage Application of PCT/NZ2018/050065, filed 10 May 2018, which claims benefit of Serial No. 731838, filed 12 May 2017 in New Zealand and which applications are incorporated herein by reference. To the extent appropriate, a claim of priority is made to each of the above disclosed applications.

FIELD

This invention relates to a bearing monitoring method and system suitable for the monitoring of faults in rolling element bearings.

BACKGROUND

Bearing monitoring systems are used to detect the appearance, presence and severity of faults within a moving bearing. For effective predictive maintenance in bearing monitoring applications, determining the size and rate of growth of a bearing fault by tracking changes over time is important as it not only enables more accurate detection and diagnosis but also allows a greater certainty of prognosis for the machine's condition and optimal timing for corrective action by maintenance engineers.

The monitoring sensor hardware may or may not be placed in physical contact with the bearing housing but is still required to identify a small, repetitive, fault-induced vibration against a background of other vibration signals. These may include noise from other machinery, noise from other parts of the same machine that includes the bearing, changes in bearing housing strain due to passage of rolling bearing elements, or seismic noise.

Many bearing monitoring systems attempt to filter out or eliminate the effects of housing strain due to rolling element passage. If using simple acceleration sensors for monitoring, changes in bearing strain can also induce changes in sensor housing strain, which can influence the overall signal measurement. Many acceleration sensors are therefore designed to eliminate or minimize these strain effects. If strain effects are considered at all, they are processed independently of defect-induced acceleration effects.

In most bearing defect monitoring applications, measures of defect severity do not increase monotonically with increasing severity. Such applications may require multiple measurements to be recorded and trended over an extended period of time to measure severity, greatly increasing the cost and complexity of these systems as well as delaying results and subsequent maintenance. In addition, defect severity information (which includes information about defect size, location and load) contained within defect-induced transients, is often lost.

Many bearing monitoring systems include multiple sensors which are often incorporated into the bearing housing, making these systems neither simple nor portable.

Many bearing monitoring systems require additional information about bearing speed before they can begin to analyse the health of the bearing. This analysis becomes complex if the speed of the bearing is changing during measurement.

The complexity of prior art techniques typically results in the need for external evaluation of data, including manual expert analysis. This does not allow a measure of bearing condition to be developed within a simple circuit associated with a sensor.

It is an object of the invention to provide a bearing monitoring method and system which overcomes at least some of these problems or which at least provides the public with a useful choice.

SUMMARY

According to one example embodiment there is provided a bearing monitoring system comprising:
i. a rolling element bearing housing;
ii. a force sensor attached to the housing which generates output signals, the force sensor comprising one or more sensor elements arranged to be sensitive to acceleration and strain;
iii. a strain detection circuit which receives the output signals and generates strain signals representative of housing strain;
iv. an acceleration detection circuit which receives the output signals and generates acceleration signals representative of acceleration forces applied to the housing; and
v. a processing circuit adapted to:
use the strain signals to synchronise the acceleration signals to rolling element pass events; and generate one or more signals indicative of bearing condition based on the synchronised acceleration signals.

According to another example embodiment there is provided a bearing monitoring system comprising:
i. a rolling element bearing housing;
ii. a force sensor attached to the housing which generates an output signal;
iii. a rolling element pass detector which detects the passing of a rolling element of a bearing and outputs rolling element pass signals;
iv. an acceleration detection circuit which receives the output signal and generates an acceleration signal representative of acceleration forces applied to the housing; and
v. a processing circuit which synchronises processing of acceleration signals based on rolling element pass signals to generate a signal indicative of bearing condition.

According to another example embodiment there is provided a method of monitoring the condition of a roller bearing via a sensor attached to a housing supporting the bearing, the sensor being sensitive to strain and acceleration, the method comprising:
i. developing a strain signal from the output of the sensor representing housing strain;
ii. developing an acceleration signal from the output of the sensor representing acceleration forces;
iii. using the strain signal to synchronise the acceleration signal to rolling element pass events;
iv. determining bearing condition based on the synchronised acceleration signal.

According to another example embodiment there is provided a bearing having an inner race, an outer race and a plurality of rolling elements between the races and a bearing monitoring circuit, the bearing monitoring circuit including:

a force sensor mounted to the inner race or the outer race or a rolling element; and a detection circuit, wherein the force sensor is configured to supply a force signal comprising an acceleration signal to the detection circuit; and the detection circuit is configured to determine bearing condition based on the acceleration signal and transmit a signal indicative of bearing condition, wherein the detection circuit is configured to use strain signals to synchronise processing of acceleration signals.

According to another example embodiment there is provided a method of monitoring the condition of a rolling element bearing via a sensor in an inner race, outer race or rolling element of the bearing, the method comprising:

i. developing a signal from the output of the sensor representing acceleration forces;

ii. developing a signal representative of housing strain; and iii. determining bearing condition based on the housing strain and acceleration forces, wherein strain signals are used to synchronise processing of acceleration signals.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

Figure 1:
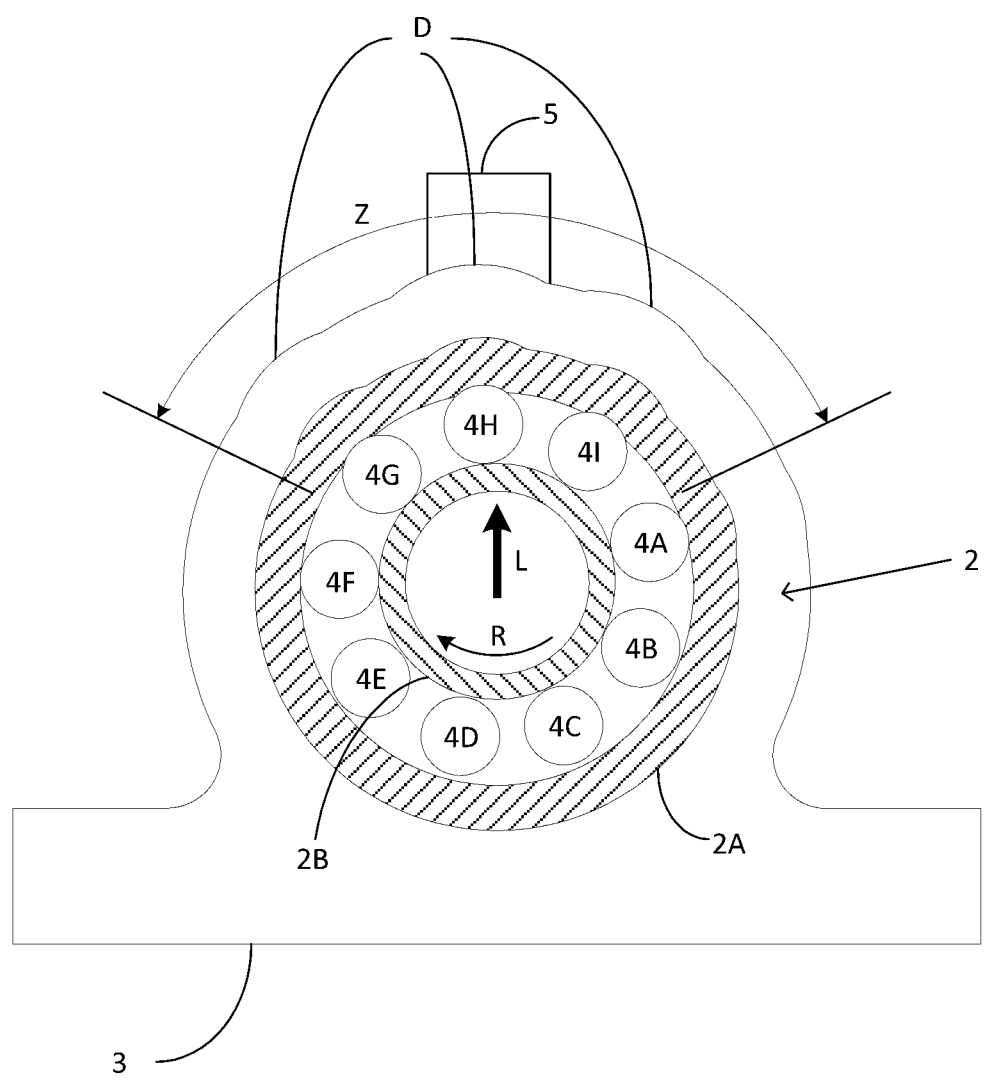
FIG. 1 shows a typical rolling element bearing in a housing and the housing distortions typically generated by rolling element movement.

The effects of a typical rolling element bearing on a bearing housing are shown in FIG. 1. A rolling element bearing 2, consisting of an outer race 2A, an inner race 2B and a plurality or rolling elements (in this case ball bearings) 4A-4I, sits within a bearing housing 3. The bearing inner race 2B is rotating in direction R and is subjected to a load in direction L. The bearing load is mostly taken up by rolling elements 4G, 4H and 4I, which cause the outer race 2A, and hence the bearing housing 3, to be deformed in a number of regions indicated at D. Since the rolling elements are rotating, these regions D will move as small ripples across the load zone Z of the bearing housing. If a force sensor 5 is attached to the housing 3 within the load zone Z, preferentially in the direction of the load 4, the attachment point of the sensor will experience changing strain, and hence movement, as the ripples D pass by.

The force sensor 5 may be attached to the housing 3 so as to enhance its sensitivity to housing strain. This may be achieved by attaching the sensor using at least two mounting points, or over a surface area, thereby ensuring that the sensor will be subjected to bending, stretching, compression or twisting forces if the localised strain between the sensor mounting points or surface area changes. The sensor may be attached to the exterior surface of the bearing housing in the area and direction of greatest bearing load. It will be appreciated that there are numerous other ways that housing design may be utilized to accentuate forces experienced by the sensor. The sensor may be attached to a wall of a cavity in the bearing housing in the area and direction of greatest load. With the removal of housing material in the region of the cavity the sensor may be subjected to mechanically amplified stresses due to the enhanced bending, stretching, compression or twisting forces in that region. Alternatively the sensor may be mounted on the outer race of a bearing or within a cavity in the outer race (or possibly even the inner race).

The force sensor 5 may be a piezoelectric sensor where the sensor includes an element made from a piezoelectric material that is in contact on one end to a base plate that is itself secured to the bearing housing, and where the piezoelectric element is in contact on the opposite end to a mass, so that the piezoelectric element will experience a strain when the mass is accelerated in a direction perpendicular to the plane of the baseplate.

The piezoelectric element may consist of a piezoelectric crystal or some other substance that exhibits piezoelectric properties such as polymer material such as PVDF. The piezoelectric sensor may be a single piezoelectric element or may include more than one piezoelectric element. A composite piezoelectric sensor may include one piezoelectric element optimized to measure base strain and another piezoelectric element optimized to measure acceleration.

Figure 2:
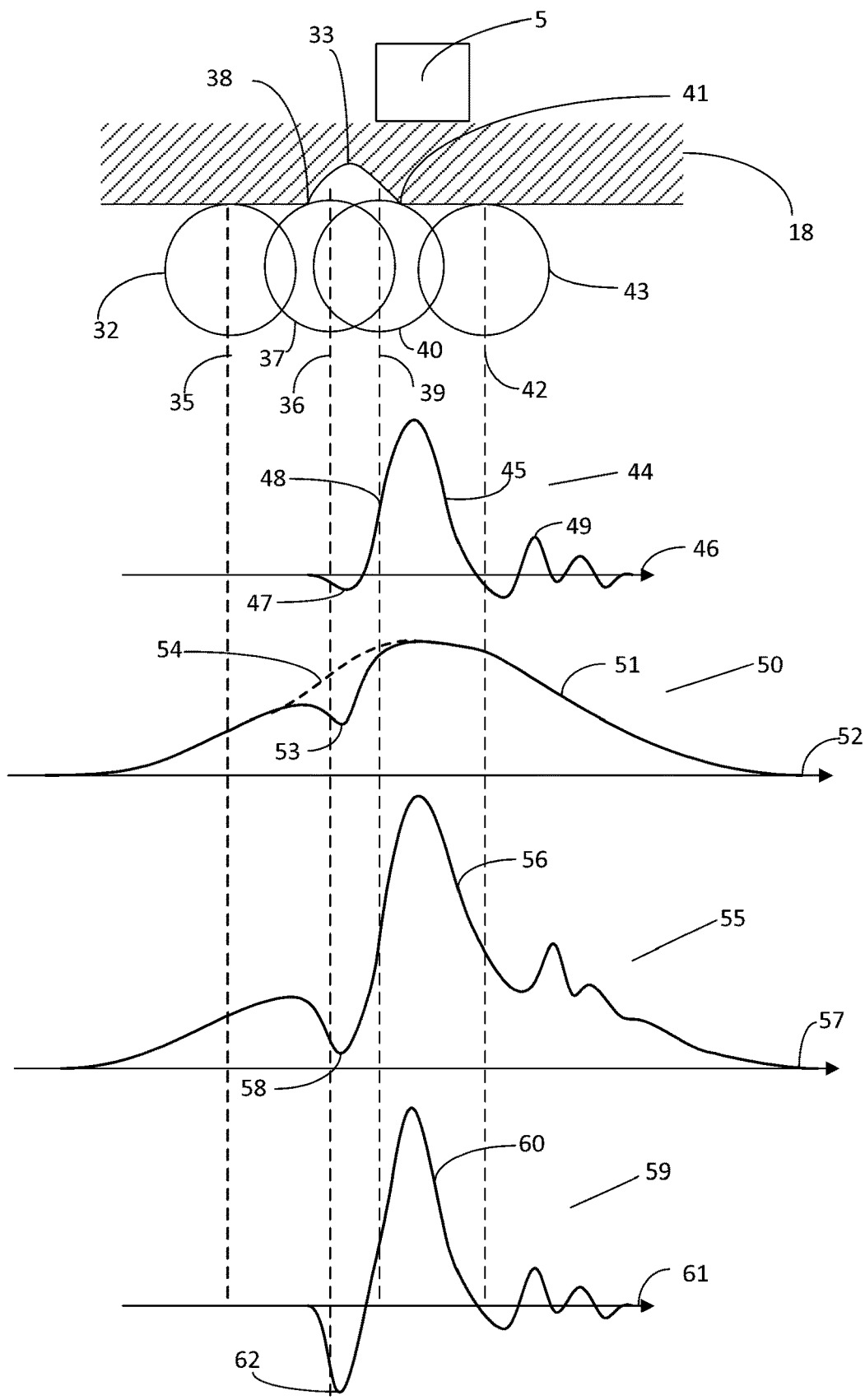
FIG. 2 shows the various signals generated from a typical piezoelectric sensor during rolling element passage through a bearing defect.

FIG. 2 shows the signals that are typically generated when the force sensor 5 is a piezoelectric element, which is sensitive to both bearing housing strain and acceleration, in response to the passage of one rolling element 32 (one of rolling elements 4A-4I) through a defect 33 as it travels from left to right in outer bearing race 2A (this being an example of the same bearing race, bearing housing, rotation direction and load direction shown in FIG. 1). Four event times are shown, corresponding to four positions of the rolling element: time 35 is when the rolling element 32 has yet to enter the defect 33; time 36 is when the same rolling element, now at position 37, has entered the defect 33 by rolling off the first edge 38 of the defect 33; time 39 is when the same rolling element, now at position 40, has encountered the second edge 41 of the defect 33 and is exiting the defect 33 by rolling on the second edge 41; and time 42 is when the same rolling element, now at position 43, has passed the defect 33.

The plot 44 shows the corresponding bearing housing acceleration 45 as a function of time 46. At time 36 as the rolling element is entering the defect 33, some of the bearing housing load is removed so the bearing housing begins to accelerate downwards as shown by the dip 47. At time 39 the rolling element at position 40 has met the second edge 41 of the defect 33 and the impact generates an abrupt upwards increase in housing acceleration 48. As the rolling element passes clear of the defect, the sudden impact at rolling element position 41 causes some residual oscillation in the bearing housing, which manifests as an oscillating decaying acceleration 49.

The plot 50 shows the corresponding bearing housing strain 51 as a function of time 52. As the rolling element at position 37 begins to enter the defect 33, the load on the bearing housing is quickly decreased, causing a temporary decrease 53 in the local bearing housing strain under the force sensor located at 5. Once the rolling element at position 39 leaves the defect 33, normal load is reapplied to the bearing housing. Note that if the defect were not present, the bearing housing strain under the force sensor 53 would follow the curve 54 and not show any temporary decrease 52.

The plot 55 shows the response of force sensor 5, which is sensitive to both housing strain and acceleration and accumulates both into a single output 56, as a function of time 57. Of particular note is that the small dip 47 in housing acceleration is enhanced by the temporary drop 52 in bearing housing strain, to produce a dip 58 that is larger than the acceleration dip 47.

Plot 59 shows the same signal 56 but with the defect-free housing strain curve 54 removed, as a function of time 61. Of particular note is the size of the dip 62 compared to the acceleration dip 47, showing how the design of the force sensor can physically magnify certain defect-induced events in the output signal 56.

It will be seen that the base strain plot 50 is a relatively consistent slowly changing curve compared to the acceleration plot shown in plot 59. The strain curve may be separated by suitable low pass filtering, or other means, and used to "window" each rolling element pass event—i.e. define a sensor capture window representing the same rolling element pass region so that cumulative events in the same rolling element pass region may be accumulated.

Figure 3:
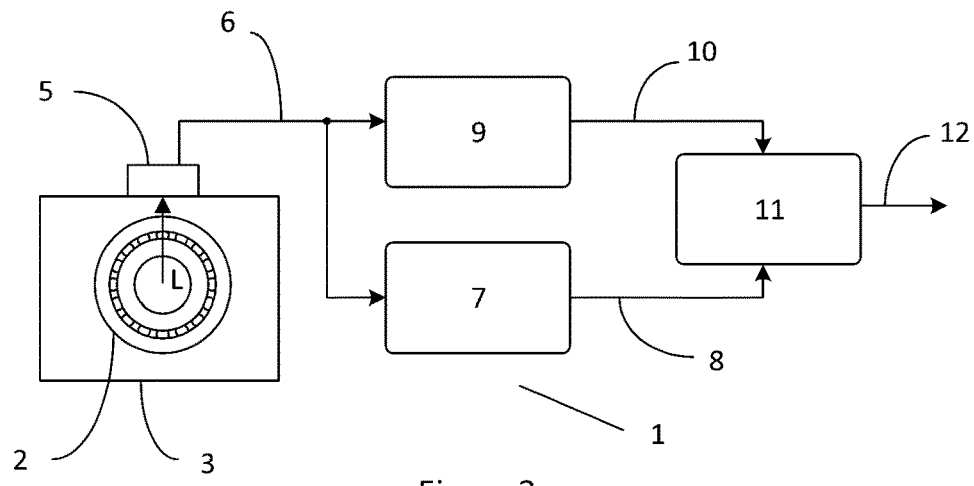
FIG. 3 is a schematic diagram of a bearing monitoring system according to one embodiment.
Figure 4:
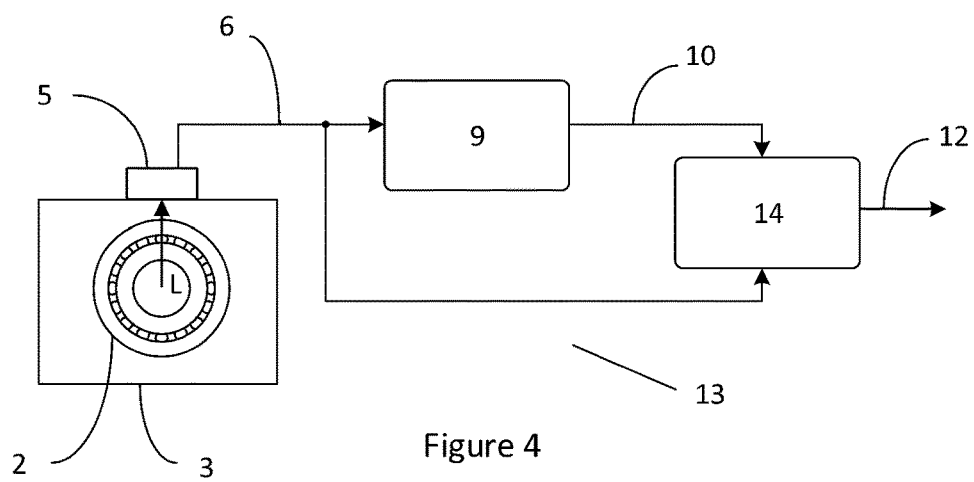
FIG. 4 is a schematic diagram of a bearing monitoring system according to a further embodiment.
Figure 5:
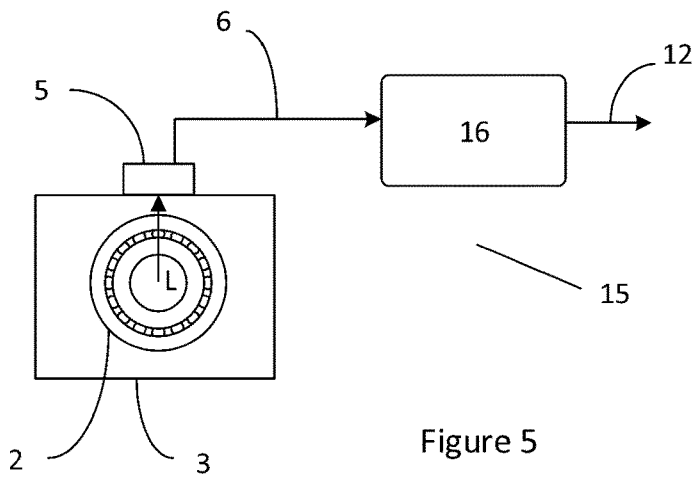
FIG. 5 is a schematic diagram of a bearing monitoring system according to a further embodiment.

FIGS. 3 to 5 show block diagrams of different monitoring system topologies.

FIG. 3 illustrates a bearing monitoring system 1 according to one example embodiment based on the arrangement shown in FIG. 1 (like integers being given the same numbers). The system 1 includes: a rolling element bearing 2 within a bearing housing 3, where the bearing is subjected to a load L; a force sensor 5 attached to the housing 3 which generates an output signal 6; a strain detection circuit 7 which receives the output signal 6 and generates a strain signal 8 representative of housing strain; an acceleration detection circuit 9 which receives the output signal 6 and generates an acceleration signal representative of acceleration forces applied to the housing; and a processing circuit 11 which generates a signal 12 indicative of bearing condition based on the strain signal 8 and acceleration signal 10.

Relating the plots in FIG. 2 to the signals in FIG. 3, a typical output signal 6 is shown as plot 55, a typical strain signal 8 is shown as plot 50 with curve 54, and a typical acceleration signal 10 is shown as plot 59. The physical accumulation of strain dip 52 and acceleration dip 47 into an output signal dip 58 is typically processed as if it were part of an acceleration signal, as will be described.

The strain detection circuit 7 may be a low-pass filter with a cut-off frequency determined by bearing geometry and estimate of rotation speed. Alternatively, the strain detection circuit 7 may be a processor that generates estimates of the housing strain either from the repeated detection of rolling element passage events or housing strain models, or a mixture of both.

The acceleration detection circuit 9 may detect signals which are not characteristic of housing strain output by the sensor, wherein the circuit may be a high-pass filter with a cut-off frequency determined by bearing geometry and estimate of rotation speed or, in a further embodiment, the circuit as part of the processing circuit 11, may subtract the estimate of housing strain 8 derived from the strain detection circuit 7.

The processing circuit 11 may accumulate the output of the strain detection circuit 7 and acceleration detection circuit 9 to develop a bearing condition signal. The polarity of the outputs of strain detection circuit 7 and acceleration detection circuit 9 may be selected so as to accentuate features of the pure acceleration plot as illustrated by the accentuated dip 62 in plot 59.

An alternate bearing monitoring system is shown in FIG. 4. The system 13 includes: a rolling element bearing 2 within a bearing housing 3, where the bearing is subjected to a load L; a force sensor 5 attached to the housing 3 which generates an output signal 6; an acceleration detection circuit 9 which receives the output signal 6 and generates an acceleration signal 10 representative of acceleration forces applied to the housing; a processing circuit 14 which receives the output signal 6 and the acceleration signal 10 and generates a signal 12 indicative of bearing condition based on the output signal 6 and acceleration signal 10.

The bearing monitoring system of FIG. 4 includes use of a method whereby: the acceleration circuit 9 isolates the higher frequency components of output signal 6, using typically a high-pass filter with cutoff frequency set by known bearing geometry and rotation speed, to produce an acceleration signal 10; the processing circuit 14 receives the acceleration signal 10 and the output signal 6 and uses large repetitive features of the output signal 6 to acquire particular sections of the acceleration signal 6, enabling these sections to be processed by the processing circuit 14 in a manner that enhances aspects of the acceleration signal 10 that are indicative of bearing defects; and whereby such aspects can be combined with bearing strain information, obtained from the output signal 6 by a means that may include low-pass filtering, known bearing geometry and bearing rotation speed to generate a signal 12 that is indicative of bearing condition.

A further exemplary bearing monitoring system is shown in FIG. 5. The system 15 includes: a rolling element bearing 2 within a bearing housing 3, where the bearing is subjected to a load L; a force sensor 5 attached to the housing 3 which generates an output signal 6; and a processing circuit 16 which receives the output signal 6 and generates a signal 12 indicative of bearing condition based on the output signal 6.

Figure 6:
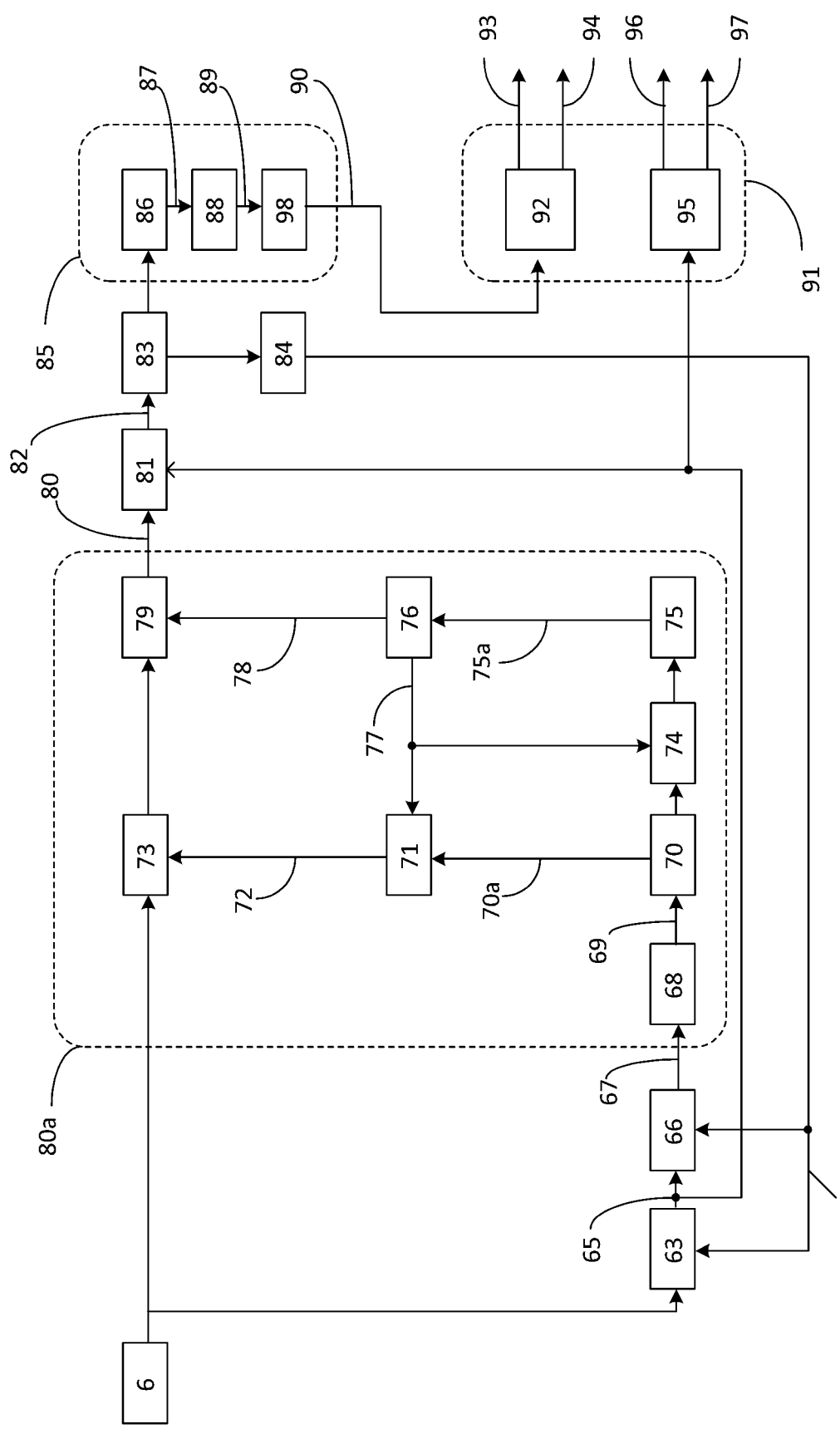
FIG. 6 is a flow chart showing the signal processing steps according to one embodiment.

The bearing monitoring system of FIG. 5 includes use of a method whereby the processing circuit 16 performs some or all of the operations described in FIG. 6 to generate a signal 12 that is indicative of bearing condition and where that signal 12 may include information on bearing rotation speed, bearing load, bearing defect location and bearing defect size.

In the above embodiments individual circuits 7, 9, 11, 14 and 16 may contain one or more instances of: an amplifier to pre-amplify the input; an analog to digital converter and anti-aliasing filters; a digital signal processor and firmware or software; a digital storage processor and firmware or software; a digital communications processor and firmware or software; a digital to analog converter and output amplifier.

In further embodiments, two or more of the circuits 7, 9 and 11 may be combined into a single circuit, wherein for example the acceleration detection circuit 9 incorporates the strain detection circuit 7, or the processing circuit incorporates the strain 7 and acceleration detection circuits 9.

In a further embodiment, the processing circuit 11, 14 or 16 may include a digital transceiver circuit. In a simple implementation the digital transceiver circuit may not transmit raw sensor data and may simply transmit bearing condition data, which may include: bearing identification information and the size of any defect (zero if no defect exists). In other implementations other parameters may be provided including bearing load etc.

In an embodiment of the invention, the size of the defect may be determined by the duration of the initial drop 62 in the defect-induced signal 60. This is representative of the period that a rolling element is unsupported by the outer race 2A when traversing defect 33.

FIG. 6 shows a method of monitoring the condition of a rolling element bearing 2 via a sensor 5 attached to a housing 3 supporting the bearing, wherein the sensor 5 generates an output signal 6 (see FIG. 3), and wherein bearing condition is described by estimated defect size, location, angular position and bearing load. Various combinations of the steps described in FIG. 6 may be omitted or combined in other embodiments of this method.

The output signal 6 from the sensor 5 is passed to a strain signal identification step 63 where a signal 65 representative of bearing housing strain is generated. In one embodiment, this step may consist of a low-pass filter with a corner frequency defined by the known bearing speed and bearing geometry. In another embodiment this step may consist of digital filtering to isolate the fundamental signal oscillation. In another embodiment this step may consist of digital filtering to isolate the fundamental signal oscillation and at least one higher harmonic of that oscillation. In a further embodiment, this step may consist of generating an ideal strain signal from at least one sine wave and then fitting that ideal strain signal to the output signal 6 using a method that alters the component variables of the ideal strain signal in order to minimize the total squared difference between output signal 6 and ideal strain signal. The step 63 may include feedback from later processing step 84 in the form of offsets or corrections to the generated strain signal 65. Step 66 takes the generated strain signal 65 and further processes it, which may involve additional filtering or other modification. Step 66 may also include feedback from step 84.

The processing steps 80a repeatedly captures specific sections of the output signal 6. The processed generated strain signal 67 is passed to step 68 where its period is scaled by an application-specific factor. This is necessary because different bearing defects can require different output signal capture conditions; a bearing outer race defect will generate a defect signal with the same period as the generated strain signal, so it is necessary to capture sections of the output signal 6 which have the same duration as one generated strain signal period; a bearing inner race defect will generate a defect signal that includes a defect signal with a different period to the generated strain signal, so it is necessary to capture sections of the output signal 6 at scaled multiples of the strain signal period, representing the same duration as an inner race defect and/or the same duration as one bearing rotation. There may also be requirements to capture sections of the output signal 6 that are the same length as some other multiple of the generated strain signal period, in which case step 68 scales the generated strain signal period accordingly.

Steps 70, 74 and 75 are threshold or trigger point detectors, wherein the scaled strain signal 69 is compared with some threshold level to generate flags 70a and 75a, corresponding to the first and third instances respectively of the threshold level over one period of the scaled strain signal 69. Step 74 identifies the second instance of the threshold level and may be used in other embodiments of the method to trigger other events. The flags 70a and 75a initiate acquisition triggers 71 and 76 respectively which in turn start 73 and stop 79 the acquisition of the output signal 6 using trigger signals 72 and 78 respectively. An additional trigger signal 77 may be used in other embodiments to generate a subsequent start trigger 71 or initiate a threshold check 74.

The acquired signal 80 is then passed to step 81, where the unscaled generated strain signal 65 is removed, leaving a residual signal 82. The presence of any residual strain signal, identifiable in one embodiment by the presence of a sinusoidal signal component, is then checked at step 83. If any adjustment to the generated strain signal is required, this is done at step 84 and the results are used as additional inputs for steps 63 and 66.

The processing steps 85 accumulate repeated acquisitions 80 to enhance small signal features. A discrimination step 86 is where acquisitions are accepted, enhanced and accepted or rejected based on pre-determined criteria that may include the presence or absence of certain features within the acquisition. The accepted set of acquisitions 87 are resampled 88 to ensure that the spatial measures represented by each acquisition 80 are constant, meaning that the processing steps in FIG. 6 are independent of changes in bearing rotation speed. The resampled acquisitions 89 are then averaged 98 or otherwise combined to produce a defect signal 90. Note that small delays or advances may be added to individual acquisitions, in order to better align features of interest so that they are not attenuated by the averaging step 98 or other acquisition combination process.

The procedure steps 91 analyse the defect signal 90 and the generated strain signal 65. The defect signal 90 is analysed 92 to produce defect location information 93 and defect size information 94. The generated strain signal 67 is analysed to produce bearing load information 96 and bearing speed information 97.

Figure 6A:
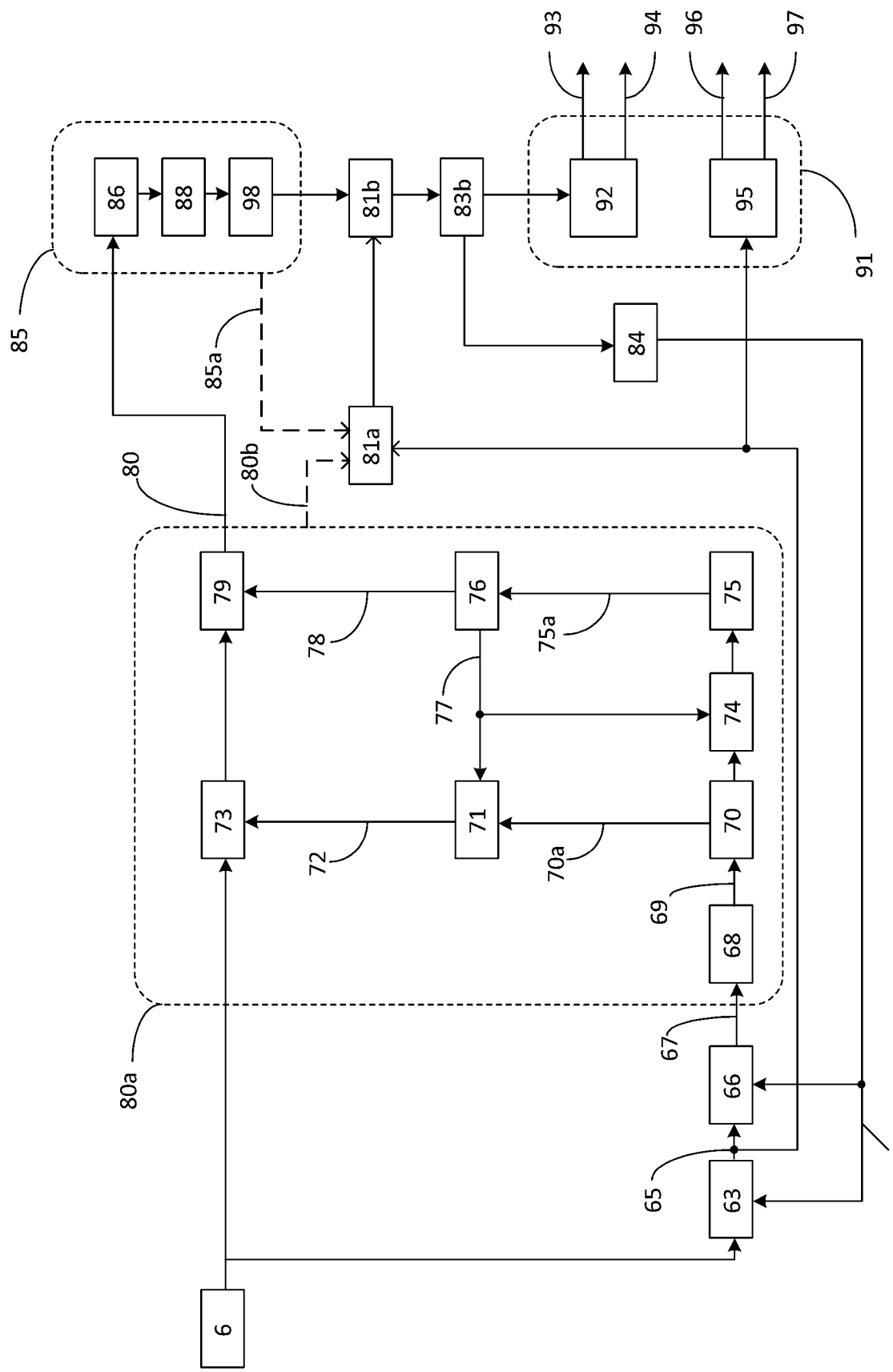
FIG. 6A is a flow chart showing the signal processing steps according to another embodiment.

An alternative embodiment of these processing steps is shown in FIG. 6A. This method is the same as the method shown in FIG. 6, except that the steps 81 (subtraction of strain signal) and 83 (identifying any residual strain signal) are now performed after the acquisition averaging steps 85. Step 81 is now step 81b and step 83 is now step 83b. Step 83b now supplies the required adjustment signal to step 84. It is often advantageous to average or otherwise combine the strain signal 65 at step 81a before subtraction at step 81b. Step 81a averages, or otherwise combines the strain signal 65 using a period scaled by the same application-specific factor used in step 68, and the same discrimination, resampling, averaging or other combinations applied in the acquisition averaging steps 85. Step 81a may therefore take optional inputs 85a from any of the processing steps 85, and may take optional inputs 80b from any of the processing steps 80a. For example, if some acquisitions 80 are rejected by the discrimination step 86, the average of these selected acquisitions may contain an averaged strain signal which is different to the average of strain signals 65; it is therefore preferable to reject certain strain signals which correspond to rejected acquisitions so that only the relevant sets of signals can be averaged and then compared, so the strain signal combination step 81a needs an input from discrimination step 86 as to whether to accept or reject a strain signal.

A preferred embodiment of the invention includes the use of a single-element piezoelectric sensor with the sensor housing designed so that strain and acceleration signals are additive for defect events. The sensor may be mounted in the area and direction of greatest bearing load, so that a bearing defect signal will occur within one half rolling element-pass period either side of a strain feature. Multiple sensors could be placed around the circumference of the housing to assist in locating the angular position of a defect.

Figure 7:
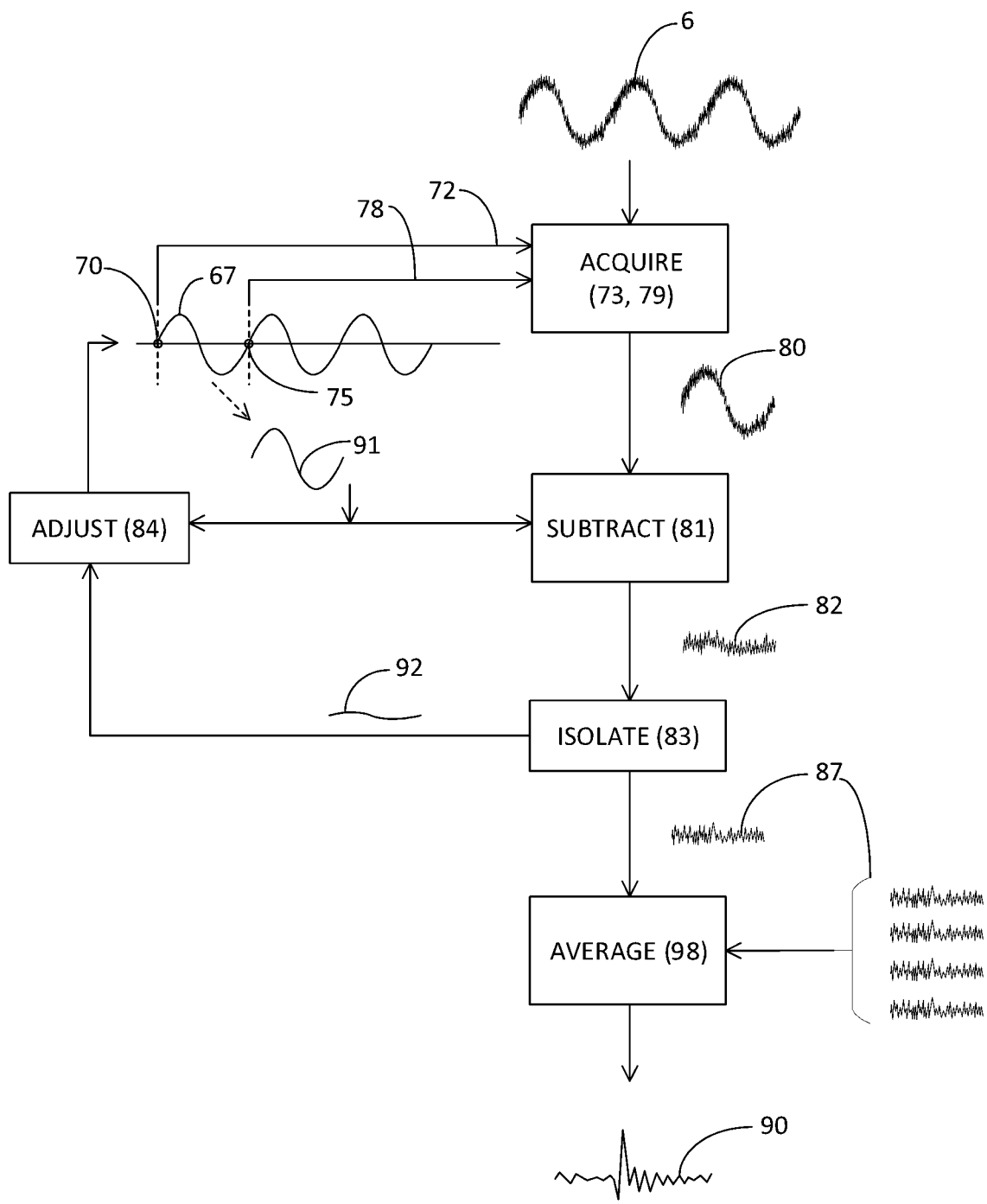
FIG. 7 is a flow chart showing further detail of the acquisition and averaging steps of FIG. 6.

An embodiment of the method described in FIG. 6 is further illustrated in FIG. 7, for the situation where a defect is present in a bearing outer race, so that the defect signal will occur at the same period as the generated strain signal 67. The raw signal 6 is acquired by the start and stop acquisition steps 73 and 79, using triggers 72 and 78 generated from zero crossings 70 and 75 of the generated strain signal 67. The scaler 68 can also be used here except that in the case of an outer race defect the scale factor is unity, so the scaler 68 has been omitted for clarity.

A section of this strain signal 91 is then subtracted 81 from the acquisition 80, to produce a residual signal 82. This is then analysed 83 to identify any residual strain signal 92, with the resulting plurality of signals 87 being accumulated 98 to produce a defect signal 90. The residual strain signal 92 is used to adjust 84 the generated strain signal 67.

Figure 8:
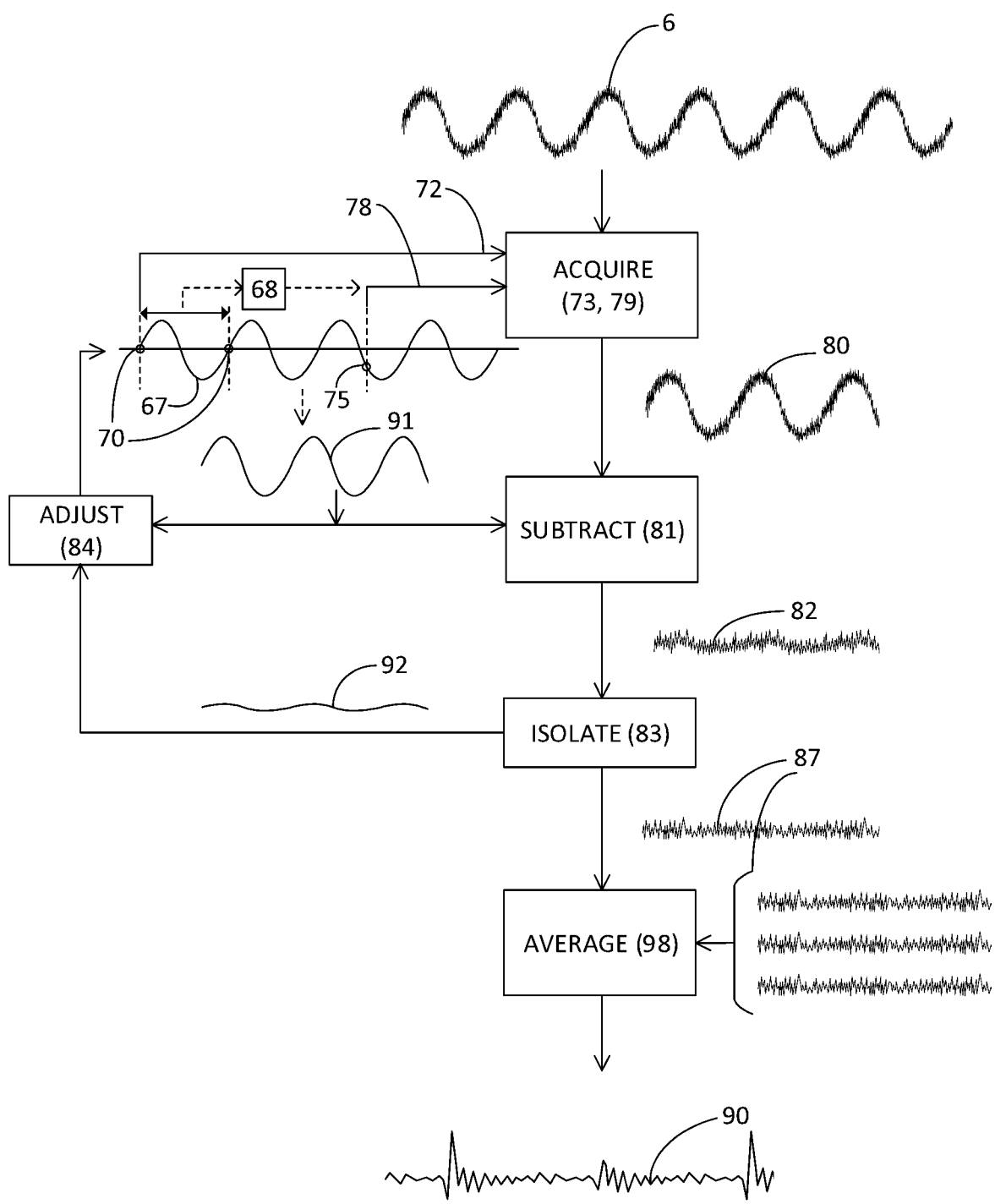
FIG. 8 is a flow chart showing a further embodiment of the signal processing steps of FIG. 6.

A further embodiment of the method described in FIG. 6 is further illustrated in FIG. 8, for the situation where a defect is present in a bearing inner race, so that the defect signal will occur at some non-integer multiple of the period of the generated strain signal 67. For simplicity this figure only shows acquisition over an exemplary 2.6 generated strain periods between trigger points 70 and 75. The raw signal 6 is acquired by the start and stop acquisition steps 73 and 79, using triggers 72 and 78 generated from the period between zero crossings 70 passed through the scaler 68. A section of this strain signal 91 is then subtracted 81 from the acquisition 80, to produce a residual signal 82. This is then analysed 83 to identify any residual strain signal 92, with the resulting plurality of signals 87 being accumulated 98 to produce a defect signal 90. The residual strain signal 92 is used to adjust 84 the generated strain signal 67. The scaler 68 can also be used in FIG. 7 except that in the case of an outer race defect the scale factor is unity, so the scaler 68 has been omitted for clarity.

Figure 9:
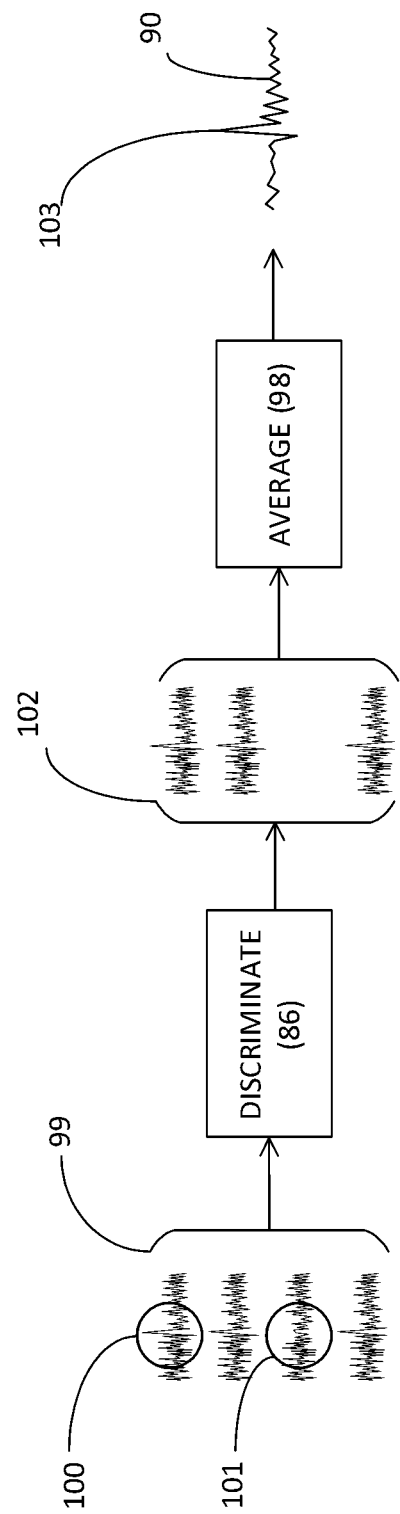
FIG. 9 is a flow chart showing further detail of the window selection and averaging steps of FIG. 6.

The discrimination step 86 is further illustrated in FIG. 9. A collection of acquisitions 99 is analysed by the discrimination step 86 where in one embodiment the presence 100 or absence 101 of a small feature in each acquisition determines whether the acquisition will be accepted, enhanced and accepted or rejected respectively, leading to a set 102 that contains only accepted and enhanced and accepted acquisitions. This accepted set 102 is then averaged 98 to produce a defect signal 90 where the small feature 103 is enhanced by noise reduction. Small delays or advances may be added to individual acquisitions before the averaging step 98, in order to better align features of interest so that they are not attenuated by the averaging step 98. This discrimination step is used in one embodiment where: the defect occurs on the bearing inner race, causing the defect-induced signal to only appear when the defect is in the bearing load zone 30; and where accepting acquisitions that occur when the defect is in the bearing load zone 30 and rejecting acquisitions when the defect is not in the bearing load zone will enhance the defect signal 90. This discrimination step is used in another embodiment where: the defect occurs on the bearing inner race, causing the defect-induced signal to appear when the defect is in the bearing load zone 30, and further multiplied by an amplitude function based on the position of the defect in the bearing load zone 30; and where accepted acquisitions are enhanced by multiplying the defect-induced signal by an amplitude function based on the bearing load zone 30, will enhance the defect signal 90.

Other embodiments of the method may include some or all of the steps that: use strain information to determine rolling element passes; define a window based on one or more rolling element pass events or one or more acceleration events; scale each window to a constant period; accumulate windows over multiple rolling element passes or events to reduce unwanted noise; determine the width of fault by the duration between key events in the accumulation window, specifically the period between the observed point of entry and the point of impact; and determine fault location (the faulty bearing part) by a non-zero fault width detected in the particular accumulation window, specifically in the case of an outer race fault, determine the fault position by the position of key events within the accumulation window with respect to the sensor location.

In some embodiments, bearing condition is determined by some or all of the steps involving: isolating those acceleration events which have the same repetition frequency as the strain signal, or the same repetition frequency as a known multiple of strain signal using bearing geometry; using known bearing geometry and the period between acceleration events to determine defect width; using known bearing geometry and the phase of the acceleration events with respect to the strain signal to determine the defect angular position; and using known bearing geometry, the defect angular position and the amplitude of the strain signal to estimate the load on the defect during the acceleration events.

Where the passing of roller elements is to be detected by means other than a piezoelectric strain sensor, sensor 5 may be replaced by a sensor that is insensitive to changes in housing strain and which also includes one or more acceleration sensing elements and one or more bearing rolling element passage sensing elements. The strain detection circuit 7 would in this case detect a signal representative of the passage of rolling elements. The bearing rolling element passage sensing elements may include any individual or combination of electromagnetic sensors, MEMs sensors, electromechanical sensors, optical sensors, and electro-resistive sensors, such sensors being suitably mounted to make the individual or combination of sensors capable of sensing bearing housing strain and acceleration.

Figure 10:
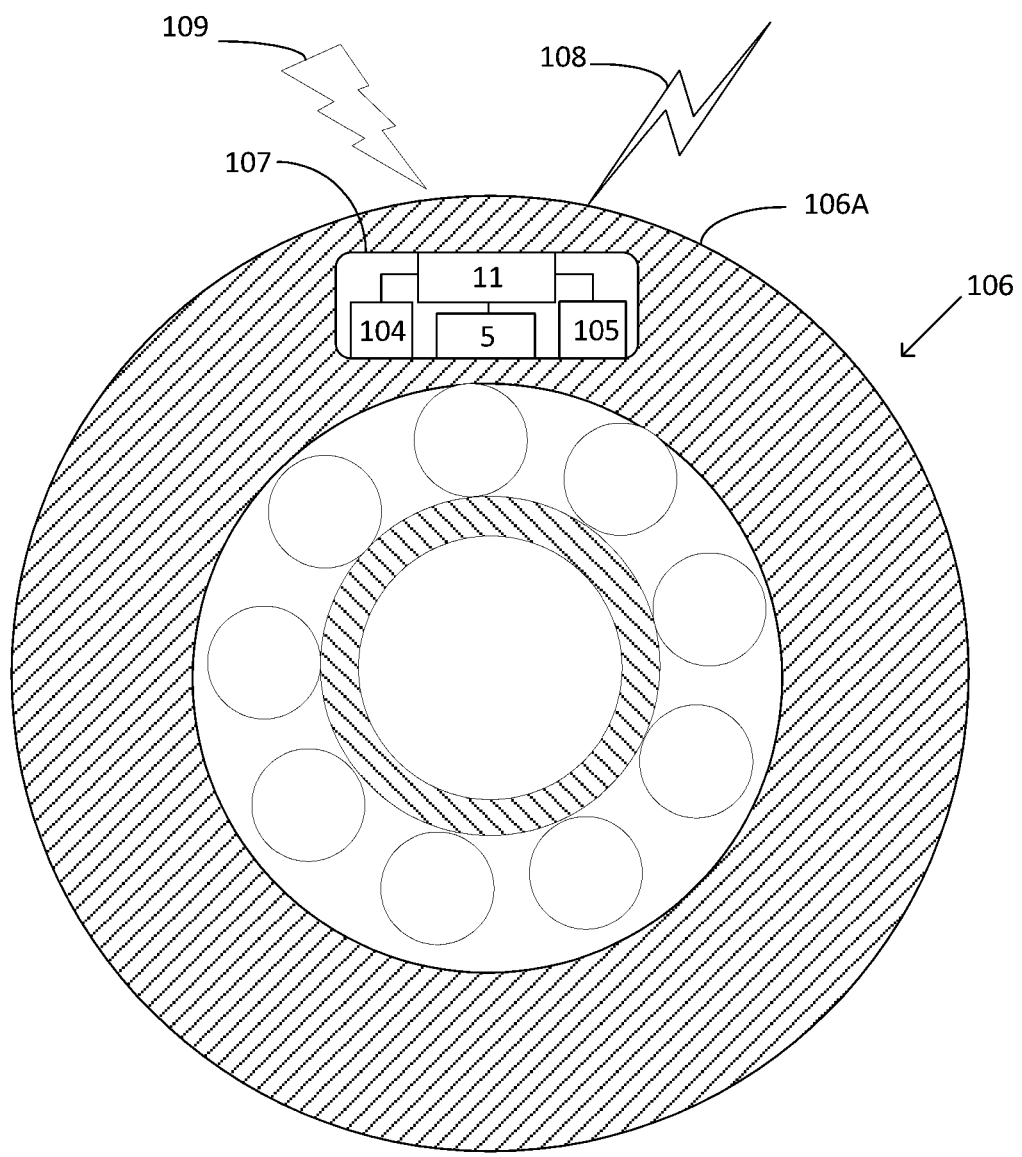
FIG. 10 shows a typical rolling element bearing with an integral bearing monitoring system.

In a further embodiment, as shown in FIG. 10, a bearing monitoring system may be integrally formed with a bearing 106. A bearing monitoring circuit including a force sensor (such as a piezoelectric sensor 5) may be mounted to the outer race and supply a force signal to a detection circuit 11. The detection circuit may determine bearing condition based on the force signal and transmits a signal 108 indicative of bearing condition. A signal 108, such as an RF signal, may be transmitted at prescribed intervals or could be event based—such as transmitting a signal containing a bearing identification code and fault condition when a fault is detected (to conserve power). The detection circuit may include a small battery 104 or be powered by a piezoelectric generator 105 or wireless charging 109 or similar. The force sensor 5 and detection circuit 11 may be mounted within a cavity 107 in the outer race 106A so that the entire fault monitoring system is contained within the bearing 106 and the cavity 107 may be designed to accentuate base strain.

In a further embodiment, the integral bearing monitoring system may be mounted to the inner bearing race. In another embodiment, the integral bearing monitoring system may be mounted within a cavity in the inner bearing race.

In a further embodiment, the integral bearing monitoring system may be mounted within a cavity in one of the rolling elements. In other embodiments, the bearing may include more than one such monitored rolling element.

In embodiments that include a small battery or a small piezoelectric generator or a wireless charging system or similar to provide power to the processing circuit, the integral bearing monitoring system may be attached to at least one bearing race that is rotating, or at least one of the rolling elements.

There is thus provided a relatively simple and inexpensive bearing monitoring method and system capable of providing a range of bearing condition information with relatively simple processing. Synchronization of rolling element pass events with accelerations due to bearing defects allows relatively simple and fast determination of the severity of defects.

The severity of a bearing defect may be determined from a single measurement, allowing real-time diagnostics (no trending over time, or external analysis, is required) and therefore reducing delays in maintenance. Additionally, the invention only requires the use of a single, simple sensor. These factors combine to make the invention simple, inexpensive, fast and comparatively portable.

When using a single, single-axis accelerometer, mounted on the bearing, rather than multiple accelerometers and strain gauges, a comparatively simple, reliable and inexpensive solution may be achieved.

The design of the housing and/or mounting of the accelerometer may accentuate features of the output signal related to rolling element passage. These features can be used to synchronize measurements of bearing defect signals, as well as providing important information about bearing speed and load.

The housing of the accelerometer may be designed to physically amplify features of the output signal related to the bearing defect severity. This selective amplification reduces the complexity of later signal processing of the defect signal. In particular, the accelerometer housing can be designed to amplify the initial dip in a defect-induced acceleration signal, the duration of which is proportional to defect severity during the initial stages of the defect growth. This provides a rapid, early and monotonic measure of defect severity.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. The method of monitoring the condition of a rolling element bearing via a sensor attached to a bearing or bearing housing, the method comprising:
   i. generating strain signals from an output of the sensor, the strain signals representing housing or bearing strain;
   ii. generating acceleration signals from an output of the sensor, the acceleration signals representing housing or bearing acceleration;
   iii. synchronizing the acceleration signals to rolling element pass events using the strain signals; and
   iv. generating one or more signals indicative of the condition based on the synchronized acceleration signals.

2. The method as claimed in claim 1 wherein the strain signals are used to window the acceleration signals and the windowed acceleration signals are accumulated to generate one or more signals indicative of bearing condition.

3. The method as claimed in claim 2 wherein strain signal features or values offset from strain signal features are used to define windows.

4. The method as claimed in claim 2 wherein window sizes are normalised.

5. The method as claimed in claim 1 further comprising accumulating both the strain signals and the acceleration signals.

6. The method as claimed in claim 1 further comprising determining bearing fault severity based on the separation between an entry event representative of where a rolling element enters a fault region, and an exit event representative of where the rolling element exits a fault region.

7. The method as claimed in claim 1 further comprising determining an entry event as a point at which the acceleration signal shows a sustained increase or decrease in value, consistent in polarity with the rolling element entering the fault.

8. The method as claimed in claim 1 further comprising determining an exit event as a point at which the acceleration signal shows an abrupt increase or decrease in value, consistent in polarity with the rolling element exiting the fault.

9. The method as claimed in claim 1 further comprising determining the position of a fault based on a phase of the strain signal and a phase of events in the acceleration signal.

10. The method as claimed in claim 1 further comprising determining the condition by isolating acceleration events which have the same repetition period as the strain signal, or the same repetition period as a known multiple of a strain signal period.

11. The method as claimed in claim 1 further comprising determining the condition by using known bearing geometry and a period between acceleration events to determine defect width.

12. The method as claimed in claim 1 further comprising determining the condition by using known bearing geometry and a phase of acceleration events with respect to the strain signal to determine a defect angular position.

13. The method as claimed in claim 1 further comprising determining the condition by using known bearing geometry, a defect position and an amplitude of the strain signal to estimate a load on a defect during the acceleration events.

14. The method as claimed in claim 1 further comprising:
   i. generating rolling element pass signals from an output of a rolling element pass sensor attached to the bearing or the bearing housing;
   ii. windowing the acceleration signals using the rolling element pass signals; and
   iii. accumulating the windowed acceleration signals to generate the one or more signals indicative of the condition.

15. The method as claimed in claim 1 further comprising transmitting the one or more signals indicative of bearing condition.

16. The method as claimed in claim 1 wherein the polarity of one of the strain or acceleration signals is inverted with respect to the other.

17. The method as claimed in claim 1 further comprising attaching the sensor to the bearing or the bearing housing in such a way that its sensitivity to strain is enhanced.

18. The method as claimed in claim 1 further comprising locating the sensor within a cavity formed in the bearing housing or the bearing.

19. The method as claimed in claim 1 wherein the sensor comprises one or more sensor elements selected from piezoelectric sensors, electromagnetic sensors, MEMs sensors, other electromechanical sensors, optical sensors and electro-resistive sensors capable of sensing strain and/or acceleration.

20. The method as claimed in claim 1 wherein the bearing comprises an inner race, an outer race and a plurality of rolling elements between the inner and outer races.

* * * * *